United States Patent Office 2,715,175
Patented Aug. 9, 1955

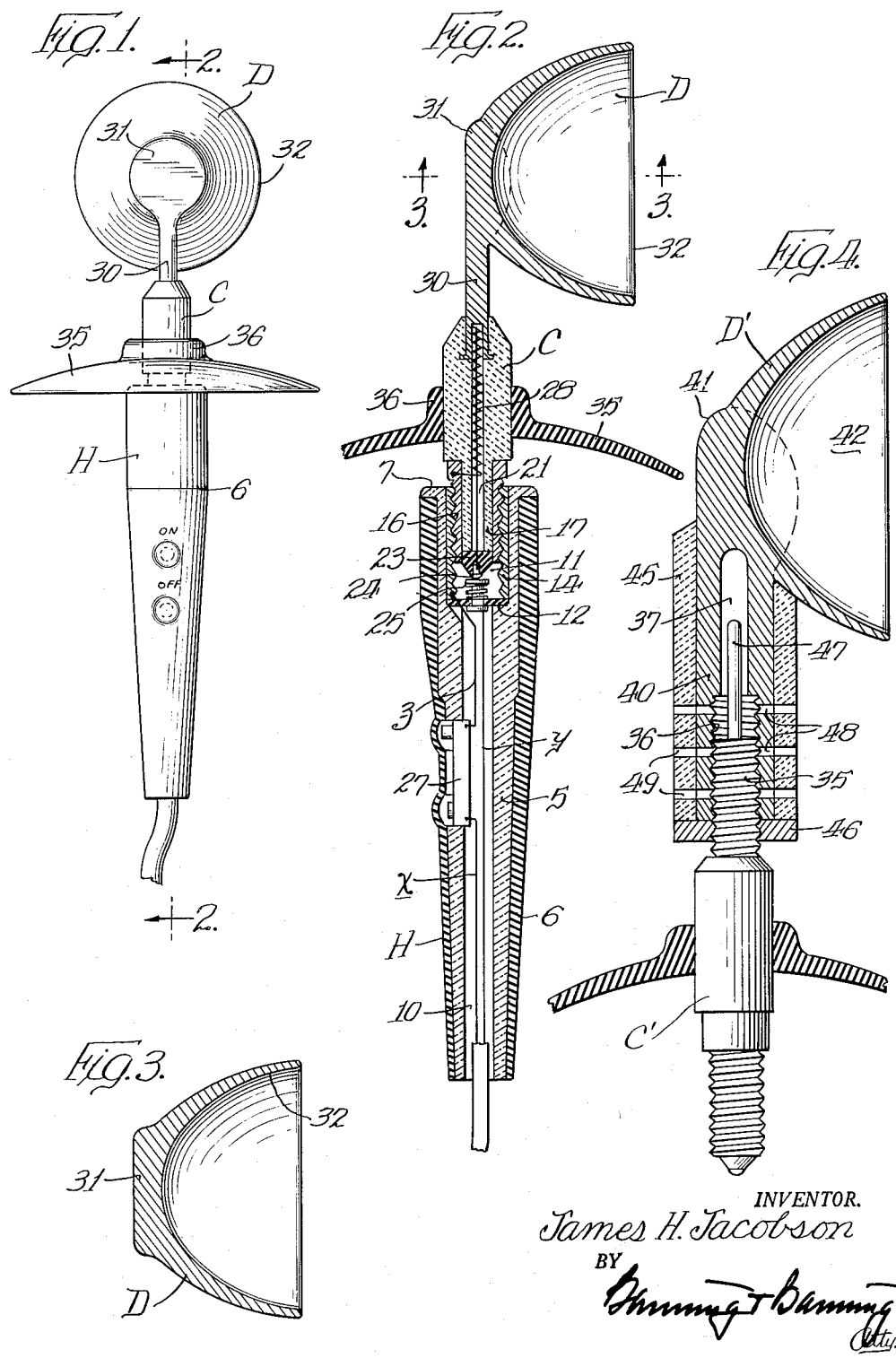

2,715,175

ICE CREAM SPOON

James H. Jacobson, Chicago, Ill.

Application June 9, 1952, Serial No. 292,406

2 Claims. (Cl. 219—21)

This invention relates to a spoon for dipping into a container of ice cream whereby to transfer a predetermined quantity of the ice cream into a serving dish or the like. A major problem with all such spoons or scoops is the difficulty encountered in advancing the spoon into a body of hard frozen cream to separate therefrom a measured quantity of the product, and later in effecting a release from the spoon bowl of all the ice cream therein when a transfer thereof into a dish is to be made.

The present invention aims to facilitate advance of the spoon bowl into a frozen body of ice cream and a subsequent separation of the ice cream therefrom, and to accomplish this with little or no effort on the part of the operator. As a result, the spoon may be handled easier and faster. For this purpose I utilize heat which is effectively conducted to the walls of the spoon bowl and there distributed widely and promptly to produce a melting of the ice cream over its surface in contact with the bowl.

Electrical energy supplied from a current source is utilized to energize a heating element that is carried in a suitably insulated body affixed to the shank of the spoon bowl. This body is chambered to accommodate therewithin the element from which heat is conducted into the bowl containing the ice cream. The heating element is extended also from the insulated body into a chamber that is formed in the shank that is extended laterally from the base of the bowl. As a result, the heat is delivered directly to the walls of the shank which is made from material having a high conductivty. The heat is also transferred to a head at the bowl base where a mass of metal is concentrated for the storage of heat. From this point of storage the heat advances outwardly by conduction toward the peripheral edges of the bowl so as to be effective at every point for the thawing and consequent yielding of the ice cream as an incident to advance of the spoon into the body of the frozen cream, and later for release from the spoon of the measured quantity of cream so scooped into the spoon.

The exemplification of my invention herein disclosed is one which is safe for even an inexperienced operator, is dependable and sturdy in its construction, and is susceptible of use with bowls of various configurations. The replacement of one bowl for another is accomplished very readily, and involves no attention whatsoever to the electrical circuit which is made and broken automatically with each replacement or removal of the bowl from the handle.

In the accompanying drawing:

Figure 1 is a top elevational view of the ice cream spoon in its entirety;

Fig. 2 is a longitudinal sectional view through the spoon;

Fig. 3 is a transverse sectional view, taken on line 3—3 of Fig. 2; and

Fig. 4 which is a view similar to Fig. 2 shows a modified construction.

The device comprises essentially a handle H to which is releasably connected a coupling C which mounts a dipper D. The handle comprises a hollow core 5, desirably of a plastic material such as Bakelite, surrounded by an electrically insulating flexible sheath 6, such as rubber for example. At the inner end of the core is an outturned flange 7 forming an abutment for the corresponding end of the sheath.

The axial passageway 10 through the core is enlarged at its inner end portion to provide a chamber 11. At the inner end of the chamber is fixedly positioned a mounting disc 12 of insulating material, and forwardly thereof a cylindrical metallic bushing 14 is fixedly fitted against the walls of the chamber. This bushing is interiorly threaded to engage with the exteriorly formed threads on a sleeve 16 which is fixedly secured upon the shank 17 of the coupling C which is desirably made of refractory material such as porcelain. An axial passageway 21 which is formed through the shank 17 and coupling C is closed at its outer end by an insulated conical plug 23 mounting a fixed contact button 24. A spring-pressed coacting contact buton 25 is carried by the mounting disc 12, the arrangement being such that the two buttons 24 and 25 will establish between them a circuit-completing contact whenever the coupling C is screw threaded into the bushing 14 for the major portion of its axial length.

Electrical energy from a suitable source (not indicated) is carried through leads $x$ and $y$ into the handle passageway 10. The lead $x$ is connected with a first terminal of a switch 27 having "on" and "off" buttons each operable in response to pressure applied thereto through the sheath 6. The lead $y$ is in connection with the contact button 25. A wire $z$ extends from a second terminal of the switch 27 to the bushing 14 so that an electrical circuit is thereby conducted through separate paths to the coupling. A wire 28 constituting a heating element, and in connection with the contact button 24 and with the bushing 16, is extended spirally within the passageway 21 and, when energized through operation of the switch 27, will produce a high temperature interiorly of the coupling C for transfer by conduction to the shank 30 of the dipper D. The hollow inner end portion of the dipper shank is anchored in the coupling C. The heating element 28 is concentrated largely in the outer end portion of the coupling and in the inner end portion of the dipper shank which is desirably produced from metal so as to facilitate conduction of heat therethrough and through its enlarged head 31 which may be formed integrally with the base of the dipper bowl 32 also of metal. The walls of the bowl 32 are progressively thinned toward their peripheral edges which may be of any desired contour, circular or otherwise. In a bowl so formed the greatest mass of metal is at its base and shank head 31, and it is here that there is a substantial storage of the heat that is conducted thereto from the heating element 28. The leading edges are thinned primarily to reduce their resistance to advance through the softened ice cream body for separation therefrom of a measured quantity of the frozen refection.

A guard is desirably carried by the coupling C, and in the form shown this consists of a shield 35 that is extended radially from a hub 36 having a frictional mounting on the coupling. Such a guard which is desirably produced from a plastic or synthetic rubber keeps the operator's hand from sliding outwardly into contact with the coupling which may be hot, and prevents the transfer thereto of any moisture or cream that may have accumulated on the handle, thereby to safeguard against short-circuiting of the electrical circuit within the implement.

In operation, the switch is manipulated as often as necessary to complete an electrical circuit to the heating element whereby to conduct heat to the dipper D. The heat moves outwardly toward the peripheral edges of the bowl, except when forced to retreat through prolonged contact of the bowl with ice cream that is to be served. The retained heat is sufficient to produce melting of the ice cream that is in actual contact with the bowl, thereby facilitating advance of the spoon into the body of the frozen product and subsequently a gravity release from the spoon bowl of the ice cream contained therein. When the bowl is empty, the heat stored within its base, reinforced by additional heat released by the heating element, will advance outwardly again to the bowl peripheral edges, thereby to recondition the bowl for the next dipping operation.

In Fig. 4 I have shown a dipper D' differing in only slight particulars from the one already described. The handle and coupling C' are essentially the same. Here the coupling is provided at its outer end with an axially extended shank 35 exteriorly threaded to engage with threads that are formed interiorly of a chamber 36 that is formed at the inner end portion of an axial passageway 37 within the dipper shank 40 whose head end 41 is joined to the base of the dipper bowl 42 having its walls progressively thinned toward the peripheral edges of the bowl. A protecting sleeve 45 of refractory material is fitted over the bowl shank 40 and held in place with the aid of a nut 46 that is threaded on to the coupling shank 35. A heating element 47 is carried by the coupling shank 35 and projected axially therefrom into the chamber 36 and passageway 37 of the bowl shank to deliver heat thereinto and, by conduction, to the walls of the bowl 42. Any excess of heat within this chamber and passageway is allowed to escape through radial ports 48 in the shank 40 in alignment with other ports 49 in the sleeve 45 when the latter is properly adjusted rotatively for this purpose. The operation of the dipper according to Fig. 4 is the same as already described in connection with Figs. 1–3.

The spoon herein described is rested upon any suitable support, when not in use. There is no need to keep it in water, heated or otherwise, with the consequent transfer of water drops into the body of frozen ice cream whenever the implement is put to repeated use.

I claim:

1. A dipping spoon for thermoplastic materials, comprising: an insulating handle portion having a hollow passage therein and an electric socket at one end; electric leads within the passage connected to said socket; a removable spoon portion including a heat conducting bowl and a heat conducting shank, the shank including a portion having a hollow chamber adjacent to the outer end thereof and a connector extending into the chamber and having its outer end removably received in said socket; an electric heating element carried by the connector and extending into the chamber; and means operatively associated with said spoon portion shank and said heating element for adjusting the position of the heating element relative to the chamber for controlling heat transfer to the shank and thus to the bowl of the spoon portion.

2. The dipping spoon of claim 1 wherein said shank is provided with openings adjacent to the heating element and opening to the atmosphere to aid in dissipating excess heat.

References Cited in the file of this patent

UNITED STATES PATENTS

| | | |
|---|---|---|
| 1,971,577 | Parker | Aug. 28, 1934 |
| 2,097,098 | Hiscox | Oct. 26, 1937 |
| 2,114,703 | Conner | Apr. 19, 1938 |
| 2,213,649 | Goodwin | Sept. 3, 1940 |
| 2,454,576 | Slack | Nov. 23, 1948 |